United States Patent
Brodeur et al.

(10) Patent No.: US 12,137,377 B1
(45) Date of Patent: Nov. 5, 2024

(54) MEASURING WIRELESS NETWORK QUALITY OF SERVICE ON MOBILE DEVICES

(71) Applicant: YourNavi, LLC, Boston, MA (US)

(72) Inventors: Stephen B. Brodeur, Boston, MA (US); Mark Daniel Marinelli, St. Augustine, FL (US)

(73) Assignee: YOURNAVI, LLC, Boston, MA (US)

( * ) Notice: Subject to any disclaimer, the term of this patent is extended or adjusted under 35 U.S.C. 154(b) by 280 days.

(21) Appl. No.: 17/456,317

(22) Filed: Nov. 23, 2021

Related U.S. Application Data

(60) Provisional application No. 63/117,902, filed on Nov. 24, 2020.

(51) Int. Cl.
*H04W 28/24* (2009.01)
*H04W 8/18* (2009.01)
*H04W 24/08* (2009.01)
*H04W 16/14* (2009.01)

(52) U.S. Cl.
CPC .......... *H04W 28/24* (2013.01); *H04W 8/183* (2013.01); *H04W 24/08* (2013.01); *H04W 16/14* (2013.01)

(58) Field of Classification Search
CPC ..... H04W 28/24; H04W 8/183; H04W 24/08; H04W 16/14
See application file for complete search history.

(56) References Cited

U.S. PATENT DOCUMENTS

| | | | |
|---|---|---|---|
| 9,173,139 B2* | 10/2015 | Lim | H04W 36/0061 |
| 9,716,558 B1* | 7/2017 | Buthler | H04B 17/309 |
| 10,623,943 B1* | 4/2020 | Sevindik | H04B 17/318 |
| 2016/0219648 A1* | 7/2016 | Awoniyi-Oteri | H04W 8/24 |
| 2016/0262200 A1* | 9/2016 | Su | H04W 52/0209 |
| 2016/0295550 A1* | 10/2016 | Sharma | H04W 48/20 |
| 2018/0070303 A1* | 3/2018 | Tambaram Kailasam | H04L 69/28 |
| 2018/0376325 A1* | 12/2018 | Xu | H04W 24/08 |
| 2019/0364492 A1* | 11/2019 | Azizi | H04W 4/44 |
| 2020/0037281 A1* | 1/2020 | Lee | H04L 65/1073 |
| 2020/0050439 A1* | 2/2020 | Bjørdal | G06F 8/61 |
| 2020/0236575 A1* | 7/2020 | Yang | H04W 48/16 |
| 2020/0267683 A1* | 8/2020 | Edge | H04W 4/029 |
| 2020/0374833 A1* | 11/2020 | Guo | H04W 8/183 |
| 2020/0383152 A1* | 12/2020 | Walia | H04W 76/12 |
| 2021/0029205 A1* | 1/2021 | Dandra | H04W 8/183 |

(Continued)

FOREIGN PATENT DOCUMENTS

| | | | | |
|---|---|---|---|---|
| CN | 112187661 A * | 1/2021 | | H04L 47/215 |
| WO | WO-2016197668 A1 * | 12/2016 | | H04W 48/18 |
| WO | WO-2020107991 A1 * | 6/2020 | | |

*Primary Examiner* — Shah M Rahman
(74) *Attorney, Agent, or Firm* — Hamilton, Brook, Smith & Reynolds, P.C.

(57) ABSTRACT

A mobile device obtains Quality of Service (QOS) data for multiple mobile network operators (MNOs) while supporting communications services with a given MNO. The communications services with the given MNO are supported through use of a first subscriber identity module (SIM) associated with the operating mobile device. While preventing interruption of the communications services with the given MNO, data is collected for determining QoS associated with a given location and connectivity of the operating mobile device to a plurality of MNOs through use of a second SIM associated with the operating mobile device.

41 Claims, 11 Drawing Sheets

QoS DATA

| DEVICE ID 405 | MNO CONNECTION 410 | CONNECTION TIME 415 | SERVING CELL 420 | LOCATION 425 | PASSIVE METRICS 430 | PASSIVE METRICS 435 |
|---|---|---|---|---|---|---|
| X | MNO A | T1 | SERVING CELL A | LOC A | [DATA] | [DATA] |
| X | MNO B | T2 | SERVING CELL B | LOC A | [DATA] | [DATA] |
| X | MNO C | T3 | SERVING CELL C | LOC B | [DATA] | [DATA] |
| X | MNO A | T4 | SERVING CELL D | LOC B | [DATA] | [DATA] |
| X | MNO B | T5 | SERVING CELL E | LOC C | [DATA] | [DATA] |
| X | MNO C | T6 | SERVING CELL F | LOC C | [DATA] | [DATA] |

400

(56) References Cited

U.S. PATENT DOCUMENTS

2021/0105626 A1\* 4/2021 Olshinka .................. H04W 8/18
2021/0112423 A1\* 4/2021 Maheshwari ......... H04W 36/32
2021/0136849 A1\* 5/2021 Nimmala .............. H04W 76/22
2023/0354009 A1\* 11/2023 Hong .................... H04W 8/183

\* cited by examiner

QoS DATA

| DEVICE ID 405 | MNO CONNECTION 410 | CONNECTION TIME 415 | SERVING CELL 420 | LOCATION 425 | PASSIVE METRICS 430 | PASSIVE METRICS 435 |
|---|---|---|---|---|---|---|
| X | MNO A | T1 | SERVING CELL A | LOC A | [DATA] | [DATA] |
| X | MNO B | T2 | SERVING CELL B | LOC A | [DATA] | [DATA] |
| X | MNO C | T3 | SERVING CELL C | LOC B | [DATA] | [DATA] |
| X | MNO A | T4 | SERVING CELL D | LOC B | [DATA] | [DATA] |
| X | MNO B | T5 | SERVING CELL E | LOC C | [DATA] | [DATA] |
| X | MNO C | T6 | SERVING CELL F | LOC C | [DATA] | [DATA] |

PERMISSION DATA

| LIST # 505 | ALLOW 510 | BLOCK 515 | | |
|---|---|---|---|---|
| 1 | MNO A | MNO B | MNO C | MNO D |
| 2 | MNO B | MNO A | MNO C | MNO D |
| 3 | MNO C | MNO A | MNO B | MNO D |
| 4 | MNO D | MNO A | MNO B | MNO C |

| Location | Carrier | Passive Score | Avg Download Speed |
|---|---|---|---|
| 16 Chauncy Street | MNO A | 9.0 | Excellent |
| | MNO B | 8.0 | Excellent |
| | MNO C | 3.5 | Fair |
| 237 Pudding Hill Lane | MNO A | 5.0 | Good |
| | MNO B | 6.0 | Good |
| | MNO C | 8.5 | Excellent |
| 31 St James Street | MNO A | 0.5 | Weak |
| | MNO B | 7.0 | Excellent |
| | MNO C | 0.5 | Weak |
| Ceylon Park | MNO A | 4.0 | Fair |
| | MNO B | 5.0 | Excellent |
| | MNO C | 1.5 | Fair |
| 212 Cypress Ave | MNO A | 8.0 | Good |
| | MNO B | 7.0 | Excellent |
| | MNO C | 9.5 | Good |

MEASURING WIRELESS NETWORK QUALITY OF SERVICE ON MOBILE DEVICES

RELATED APPLICATION

This application claims the benefit of U.S. Provisional Application No. 63/117,902, filed on Nov. 24, 2020. The entire teachings of the above application are incorporated herein by reference.

BACKGROUND

A mobile network operator (MNO), also known as a wireless service provider, wireless carrier, cellular company, or mobile network carrier, is a provider of wireless communications services that owns or controls all the elements necessary to sell and deliver services to an end user, including radio spectrum allocation and wireless network infrastructure. Typically, a MNO must own or control access to a radio spectrum license from a regulatory or government entity. Frequency allocation (or spectrum allocation or spectrum management) is the allocation and regulation of the electromagnetic spectrum into radio frequency (RF) bands, which is normally done by governments in most countries. In the United States, the Federal Communications Commission (FCC) facilitates frequency allocation.

A band is a range of frequencies within a specific signal, from the lowest limit to the highest limit. Cellular bands are the sets of radio frequency ranges within the ultra-high frequency band that have been assigned for cellular-compatible devices (mobile devices), including mobile phones, to connect to cellular networks.

A MNO's principal business is to establish a commercial relationship either directly or indirectly with end users of their wireless network services. Once established, the MNO permits the end user to access and interact with its wireless network, including enabling an ability to transmit and receive data over the MNO's licensed cellular bands via the MNO's wireless network infrastructure. To activate access to its wireless network services, MNOs require a specific software and settings package (carrier settings) to run on the end user's mobile device. Typically, carrier settings are installed:

a) on an insertable physical subscriber identity module (pSIM), commonly referred to as a SIM card;
b) as an embedded subscriber identity module (eSIM);
c) as an application run on the mobile device's local profile assistant (LPA);
d) as a setting in the mobile device operating system;
e) as a mobile application that can be downloaded from the operating system's marketplace or another source; or
f) any combination thereof.

SUMMARY

Example embodiments include a method of obtaining Quality of Service (QOS) data with an operating mobile device, such as a cellular device, a smart phone, a tablet, a laptop, or any other device with wireless communications features, including a mobile or stationary Internet of Things (IoT) device that may connect to a wireless network (e.g., a smart meter installed at a home). In one embodiment, communications services with a first mobile network operator (MNO) are supported through use of a first subscriber identity module (SIM) associated with the operating mobile device. While preventing perceptible interruption of the communications services with the first MNO or perceptible degradation of the communications services as experienced by the user of the mobile device, data is collected for determining Qos associated with a given location and connectivity of the operating mobile device to a plurality of MNOs including a second MNO through use of a second SIM associated with the operating mobile device.

The data for determining QoS may be collected by connecting to a second MNO corresponding to subscriber information indicated by the second SIM. QOS of the second MNO may be determined for the given location of the mobile device. The mobile device may then be disconnected from the second MNO, and then connected to a third MNO corresponding to subscriber information indicated by the second SIM. QoS of the third MNO may be determined for the given location of the mobile device. Further, the mobile device may be connected to the first MNO corresponding to subscriber information indicated by the second SIM, and QoS of the first MNO may be determined for the given location of the mobile device.

The data for determining QoS may be collected by determining at least one of a radio access network technology of a serving cell of the second MNO, signal strength of the serving cell, signal quality of the serving cell, channel band of the serving cell, spectrum frequency of the serving cell, channel width of the serving cell, congestion on the serving cell, physical location of the serving cell, and carrier aggregation status of a connection to the second MNO. Likewise, the data for determining QoS may be collected by determining some or all of the same metrics for one or more neighbor cells, including a radio access network technology of a neighbor cell of the second MNO, signal strength of the neighbor cell, signal quality of the neighbor cell, channel band of the neighbor cell, spectrum frequency of the neighbor cell, channel width of the neighbor cell, congestion on the neighbor cell, physical location of the neighbor cell, and carrier aggregation status of a connection to the second MNO. The data for determining QoS may also be collected by determining active metrics, such as download speed, upload speed, latency, and jitter.

The QoS data may be transmitted to a server, the QoS data indicating the service quality of at least the second MNO and the given location of the mobile device. The QoS data may be transmitted via a connection to the first MNO enabled by the first SIM, via a connection to the second (or other) MNO enabled by the second SIM, and/or via a Wi-Fi channel or other wired or wireless communications channel (e.g., Bluetooth).

Permission to connect to the second MNO may be verified based on a table indicating a plurality of MNOs. The table may associate a permission to connect to each of the plurality of MNOs. Connection with a fourth MNO may be refrained based on an indication by the table indicating that connection to the fourth MNO is not permitted. The table may be configured based on external data indicating a predicted QoS for at least one MNO, the predicted QoS being based on prior QoS data collected from a plurality of mobile devices. The table may be updated to indicate permission to connect to a third MNO and to indicate that connection to the second MNO is not permitted. Permission to connect to the third MNO may then be verified based on the table. The table may be updated based on data received by the mobile device from a remote server. Further, table may be a first table, and permission to connect to a third MNO may be verified based on a second table indicating a plurality of MNOs. While collecting data for determining QoS, the first and second tables may be cycled between for verifying permission to connect to the second and third MNOs.

The second SIM is one of an embedded-SIM (eSIM) and a physical SIM (pSIM). A network selector module of the second SIM may facilitate connecting to the plurality of MNOs. A QOS measurement module of the second SIM may facilitate collecting the data for determining QoS.

Based on the data for determining QoS, a subsequent MNO may be selected for communications with the mobile device. The mobile device may then be disconnected from the first MNO and connected to the subsequent MNO, the subsequent MNO being one of plurality of MNOs excluding the first MNO. The mobile device may then conduct communications via the subsequent MNO. The subsequent MNO may be connected with the mobile device via the first SIM, and the first SIM may be configured for communications with the subsequent MNO.

The data for determining QoS may be collected by continuously cycling through data collection of the connectivity to each of the plurality of MNOs over a given length of time. The data for determining QoS may be collected by collecting the data for each of the plurality of MNOs within a given interval of time (e.g., 10 seconds, 30 seconds, 60 seconds, or any other interval between 1 second and 60 minutes).

Compressed QoS data may be generated from the data for determining QoS, the compressed QoS data indicating the service quality of at least the second MNO and the given location of the mobile device and having a reduced file size relative to the data for determining QoS. The compressed data may then be transmitted to a server.

Further embodiments include a method of determining QoS. In one embodiment, operation of at least one radio in a mobile device may be enabled, the at least one radio being tunable to multiple frequencies licensed by MNOs. While preventing interruption of communications services with a first MNO, a plurality of MNOs, including a second MNO, may be assessed via the at least one radio tuned to a respective frequency of each of the plurality of MNOs, to collect data for determining QoS for each of the plurality of MNOs in accordance with a command issued through an operating system of the mobile device. Based on the data, QoS of each of the plurality of MNOs are determined for a given location of the mobile device. A representation of the QoS of each of the plurality of MNOs may then be output.

Determining the QoS may include determining at least one of a radio access network technology of a serving cell of the second MNO, signal strength of the serving cell, signal quality of the serving cell, channel band of the serving cell, spectrum frequency of the serving cell, channel width of the serving cell, congestion on the serving cell, physical location of the serving cell, and carrier aggregation status of a connection to the second MNO. Likewise, determining the QoS may include determining some or all of the same metrics for one or more neighbor cells, including a radio access network technology of a neighbor cell of the second MNO, signal strength of the neighbor cell, signal quality of the neighbor cell, channel band of the neighbor cell, spectrum frequency of the neighbor cell, channel width of the neighbor cell, congestion on the neighbor cell, physical location of the neighbor cell, and carrier aggregation status of a connection to the second MNO. Determining the QoS may include determining active metrics, such as download speed, upload speed, latency, and jitter.

The QoS data may be transmitted to a server, the QoS data indicating the service quality of at least the second MNO and the given location of the mobile device. The plurality of MNOs may be assessed by continuously cycling through data collection of the connectivity to each of the plurality of MNOs over a given length of time. The plurality of MNOs may be assessed by collecting the data for each of the plurality of MNOs within a given interval of time (e.g., 10 seconds, 30 seconds, 60 seconds, or any other interval between 1 second and 60 minutes).

Compressed QoS data may be generated from the data, the compressed QoS data indicating the service quality of at least the second MNO and the given location of the mobile device and having a reduced file size relative to the data. The compressed data may then be transmitted to a server.

Further embodiments include a computer-readable medium storing instructions. When executed by an operating mobile device, the instructions may cause the mobile device to support communications services with a first MNO through use of a first SIM associated with the operating mobile device. While preventing perceptible interruption of the communications services with the first MNO, the instructions may further cause the mobile device to collect data for determining QoS associated with a given location and connectivity of the operating mobile device to a plurality of MNOs including a second MNO through use of a second SIM associated with the operating mobile device.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 4 is a table illustrating QoS data in one embodiment.

FIG. 5 is a table illustrating permission data in one embodiment.

FIG. 9 is a screenshot of a user interface displaying QoS data in one embodiment.

DETAILED DESCRIPTION

Figure 1:
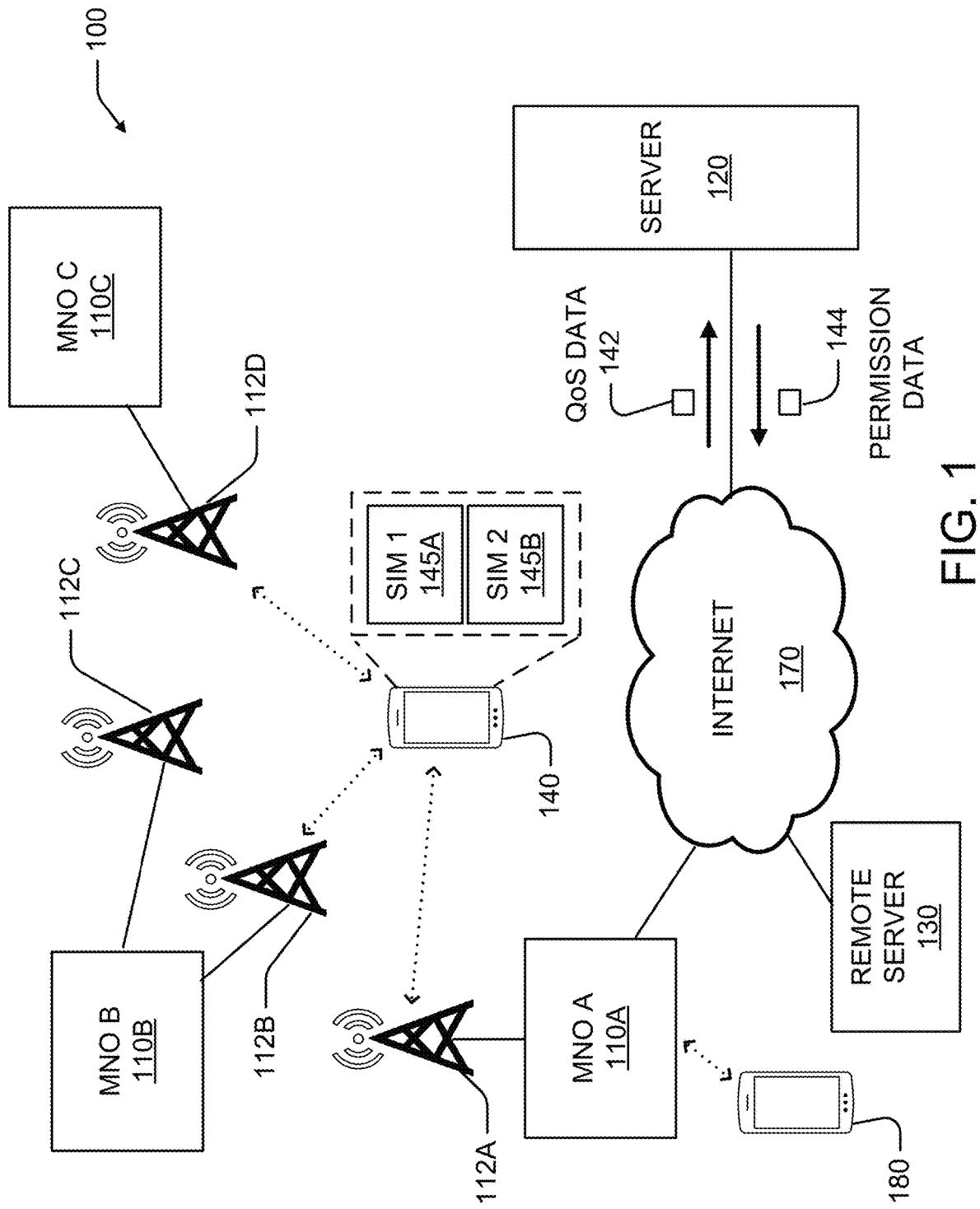
FIG. 1 is a diagram illustrating a network in which example embodiments may be implemented.

A description of example embodiments follows.

Consumers typically decide to purchase wireless service from an MNO based on: (1) service cost; (2) included features (e.g., international calling or video streaming content); (3) selection and discounts on cellular devices (e.g., cost of a new phone); and (4) the perceived quality of the MNO's wireless network. Major surveys cite MNO network quality as the most important consumer selection criterion. Unfortunately, reliable and unbiased MNO network quality information is difficult to obtain, particularly for a consumer trying to evaluate the performance of a new MNO in the specific locations that the end user frequents. There is currently no method that allows a consumer, using their existing wireless handset, to test the quality of the networks of the major MNOs at the same time and at the same location. By the nature of wireless networks, one MNO can have superior QoS in one location and another MNO can have inferior QoS at the same location. For end users considering which MNO to purchase service from, there is no data source from which they can assess the relative network quality of service of one MNO versus another, at a specific location and at a specific time, based on measurements taken from their mobile device. As a result, consumers are left to use (1) word-of-mouth characterizations of MNO network quality (e.g., from friends and family); (2) aggregated information from 3rd parties that attempt to characterize the network quality of MNOs at some geographic abstraction (e.g., zip code) which is too broad; and (3) MNO self-reported "coverage maps." None of these sources are sufficient to help a consumer accurately assess the expected network QoS between MNOs in their home, office, or location they otherwise frequent.

Wireless network QoS can be broadly evaluated across four key performance indicator (KPI) pillars. The first is the radio frequency (channel or spectrum allocation) and the channel width (e.g., amount of spectrum) allocated to a mobile device. MNOs typically license and offer service over three frequency ranges: so-called low-band frequency at ~800 MHZ, mid-band at ~1,800 MHz, and high-band at >2,500 MHz. A mobile device can switch between channels without the user's knowledge and without interrupting the user's basic voice and data services. Each channel has unique radio frequency characteristics, as measured by signal propagation and data throughput (e.g., signal at lower frequencies typically travels farther and can penetrate obstructions more effectively than signal at higher frequencies but with significantly slower data throughput speeds). A wider channel (e.g., a 100 MHz block is wider than a 10 MHz block) offers the potential for increased data throughput speeds and enhanced network QoS. Depending on MNO network design and asset deployment (e.g., cell site placement, antenna configuration, and network usage), a mobile device may be limited to certain channels at a specific location. This directly effects the end user's network QoS.

The second pillar is the access technology offered by the MNO at a given location. Today's ubiquitous network access technology is commonly referred to as 4th generation (4G). The newest network access technology is commonly referred to as 5th generation (5G). 5G can offer data throughput speeds 2× to 100× faster than 4G. If a mobile device can access 5G at a specific location, the end user typically experiences improved network QoS at that location.

The third pillar of network QoS is signal measurement on the mobile device, including signal strength (e.g., the radio frequency power being received by the mobile device) and signal quality (e.g., the amount of noise or other imperfections and deterioration present in the signal). Strong signal measurements at a given location are correlated with improved network QoS. Likewise, poor or non-existent signal measurements at a given location are a strong predictor of deficient network QoS.

The fourth pillar of network QoS is network congestion and interference. Network congestion and interference can be caused by a several conditions, including (1) the number of mobile devices simultaneously attached a cell site; (2) the total simultaneous data consumption of all mobile devices on a cell site; (3) the proximity of neighboring network assets (e.g., other cell sites which transmit competing wireless signals); and (4) other factors. A mobile device that experiences higher than average congestion or interference will, in general, see deterioration in network QoS.

The network QoS KPIs referenced above are dynamic, and vary significantly across time and location. As a result, measurements of network QoS KPIs must occur over a sufficient length of time and at all the unique locations that a user frequents to adequately characterize the overall network service quality that the user can expect for a given MNO.

The measurements described above require processing and analysis of a very large amount of information (i.e., all network QoS KPIs collected across time and space), making it impractical for a consumer to perform an evaluation without process automation and the production of an actionable insight. Many state-of-the-art wireless handsets are equipped with eSIM technology that, in some embodiments, eliminates any requirement for end users to obtain any additional hardware (e.g., a pSIM).

Certain mobile devices and operating systems, including iPhone/iOS, block or restrict end user or third-party access to certain network QoS KPIs. Example embodiments may improve iPhone user's ability to assess to certain network QoS KPIs.

Example embodiments may maximize a mobile device's ability to enable real-time monitoring of network QoS KPIs across a plurality of MNOs, record this data, and present results to users as an actionable insight of expected network QoS by MNO, thereby improving consumer transparency and enhancing the process of choosing a MNO for their mobile device. As a result, example embodiments can empower users of mobile devices to collect detailed QoS data on multiple MNOs for their choice of locations, thereby enabling them to find an optimal MNO for their location, desired services, and cost.

FIG. 1 is a diagram illustrating a network 100 in which example embodiments may be implemented. The network 100 includes mobile network operators (MNOs) 110A-C each providing communications services for their respective subscribers. The MNOs 110A-C may connect with their subscribers' devices through multiple cell sites 112A-D (e.g., a cell tower) and/or other access points such as femtocells, Wi-Fi routers or other wireless transceivers. For a given subscriber, a cell site in active service to the subscriber may be referred to as a serving cell, while nearby cell sites that can potentially provide service to the subscribers may be referred to as neighbor cells. A mobile device 140, operated by a subscriber to one or more of the MNOs 110A-C, may connect to one of the cell sites 112A-D to gain access to communications services (e.g., phone service, Internet communications) through one of the MNOs 110A-B.

In the example shown, the user of the mobile device 140 is a subscriber of MNO A 110A. To verify this relationship, the mobile device includes a first subscriber identity module (SIM) 145A that identifies the subscriber and directs the mobile device to connect to cell sites associated with MNO A 110A, such as the cell site 112A. As shown, the cell site 112A operates as a serving cell for the mobile device 140, wherein MNO A 110A can provide communications services for the mobile device 140 through its wireless connection to the cell site 112A. For example, MNO A 110A may facilitate a call between the mobile device 140 and a remote mobile device 180, and may provide access to the Internet 170 for data communications.

Although the mobile device 140 may be served by MNO A 110A, the mobile device 140 may also be proximate to cell sites 112B-D that are operated by other MNOs, MNO B 110B and MNO C 110C. The subscriber may wish to consider subscribing to MNO B 110B or MNO C 110C, particularly if either MNO provides superior QoS compared to that of MNO A 110A. QoS is dependent on the location of the mobile device 140, and, thus, the subscriber may be most interested in comparing QoS among available MNOs for the location(s) frequented by the subscriber.

To determine QoS of multiple MNOs, the mobile device 140 may include a second SIM 145B that can facilitate communications with each of the multiple MNOs. The second SIM 145B may be an embedded-SIM (eSIM), which may encompass a software application operated by the mobile device 140. Alternatively, the second SIM 145B may be a physical SIM (pSIM), and the first SIM 145A may be either an eSIM or a pSIM. The second SIM 145B may be configured to operate concurrently with the communications services operated by the mobile device 140 via the first SIM 145A. Thus, utilizing the second SIM 145B while preventing perceptible interruption of the communications services with MNO A 110A, the mobile device 140 may collect data for determining QoS associated with a given location and connectivity of the mobile device 140 to a plurality of MNOs, including MNO B 112B and MNO C 110C. The mobile device 140 may prevent such interruption by performing its operations to collect the QoS data in a manner that does not interfere with or disrupt the communications services with MNO A 110A. Optionally, the mobile device 140 via the second SIM 145B may also collect QoS data for MNO A 110A while supporting the communications services with MNO A 110A via the first SIM 145A. To identify a target MNO for QoS data collection during a given time period, the mobile device 140 may process permission data 144 transmitted from a server 120, and may communicate with a remote server 130 (e.g., a home location register (HLR) server) to verify the permission data, as described in further detail below.

As determined by the second SIM 145B, the mobile device 140 may collect active and/or passive metrics for determining QoS of the MNOs. Passive metrics may be determined by the mobile device 140 establishing a communications channel with the MNO and reading the passive metrics, and may be determined without the mobile device 140 transmitting data to a cell site. Optionally, some passive metrics may be determined without establishing a communications channel with the MNO. Passive metrics may include radio access network technology of a serving cell of the MNO, signal strength of the serving cell, signal quality of the serving cell, channel band of the serving cell, spectrum frequency of the serving cell, channel width of the serving cell, congestion on the serving cell, physical location of the serving cell, and carrier aggregation status of a connection to the second MNO. In addition to collecting such data for a serving cell (i.e., a cell site providing an active communications channel to the mobile device), The mobile device 140 may also collect some or all of the same metrics from one or more neighbor cells, such as cell site 112C, which are candidates to become serving cells for further communications. Active metrics may be determined by the mobile device 140 transmitting data via an active communications channel with the MNO via a serving cell such as cell site 112B, and may include download speed, upload speed, latency, and jitter.

The mobile device 140 may then transmit the collected QoS data 142 to the server 120, the QoS data 142 indicating the service quality of one or more of the MNOs 110A-C and the given location of the mobile device 140. The QoS data 142 may be transmitted via a connection to an MNO enabled by the first SIM 145A (e.g., MNO A 110A), via a connection to another MNO enabled by the second SIM (e.g., MNOs 110B-C), and/or via a Wi-Fi channel. To optimize efficiency, the mobile device 140 or another component in the path of the communications channel may compress the QoS data 142 to generate compressed QoS data having a reduced file size, and transmit the compressed QoS data in place of the QoS data 142.

In the example described above, the second SIM 145B may store encrypted authorization keys from MNO B 110B for the mobile device 140 to connect to the respective towers 112B and 112C. The second SIM 145B may also store encrypted authorization keys from MNO C 110C for the mobile device 140 to connect to the respective tower 112D. The second SIM 145B may further store encrypted authorization keys from MNO A 110A for the mobile device 140 to connect to the respective tower 112A. Without these encryption keys, the mobile device may not be permitted to handshake with each of the cellular site.

Figure 2A:
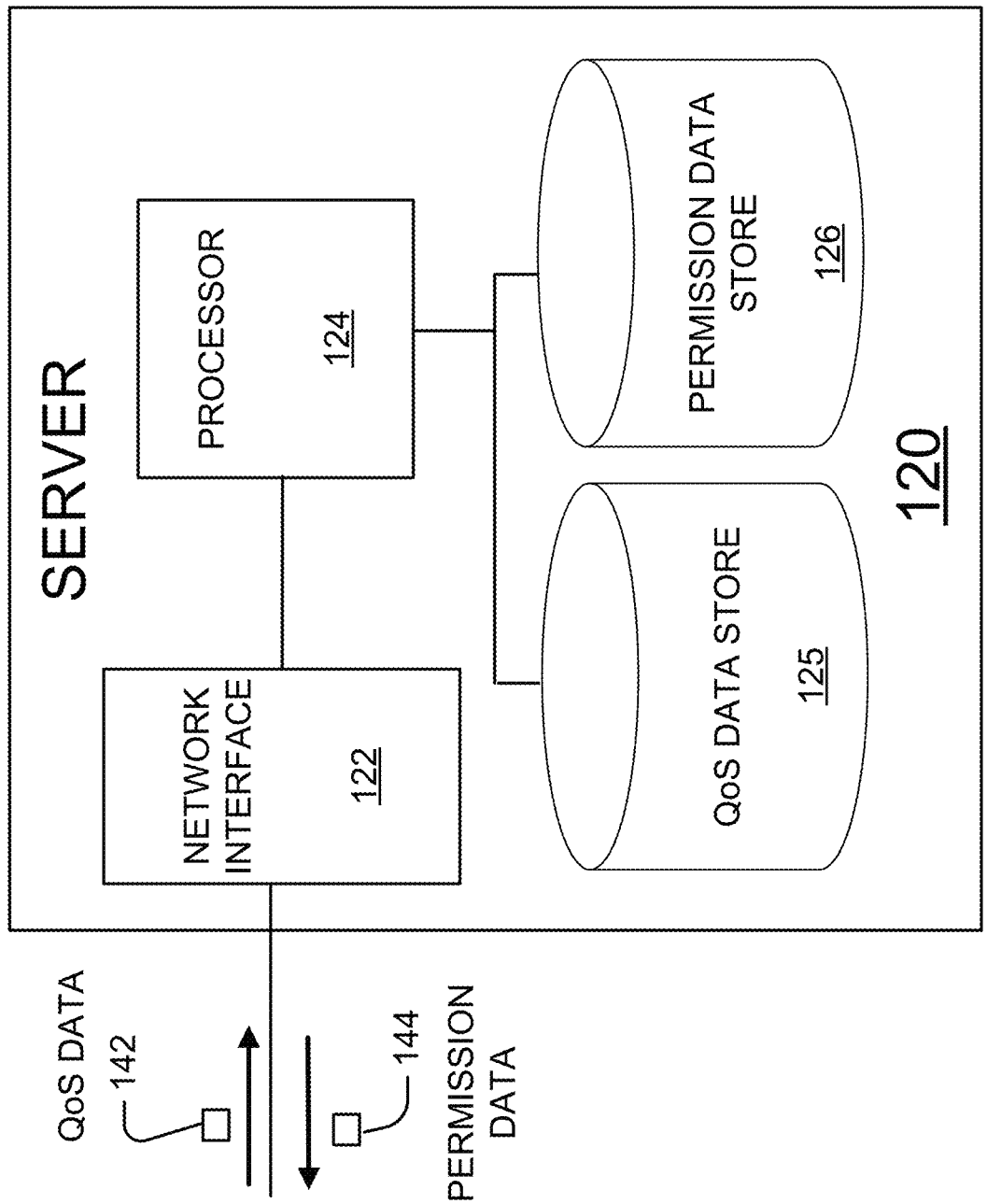
FIG. 2A is a block diagram of a server in an example embodiment.

FIG. 2A illustrates the server 120 in further detail. The server 120 may include a network interface 122 for communicating with the mobile device 140 via MNO A 110A and the Internet 170 and collecting the QoS data 142. A processor 124 may store the QoS data 142 to a QoS data store 125 in its entirety or as a reduced data set. The processor 124 may also perform analysis, filtering and/or evaluation operations on the QoS data 142, as described below, to produce actionable QoS information for presentation to a user (e.g., subscriber). The server 120 may also include a permission data store 126 storing the permission data 144.

Figure 2B:
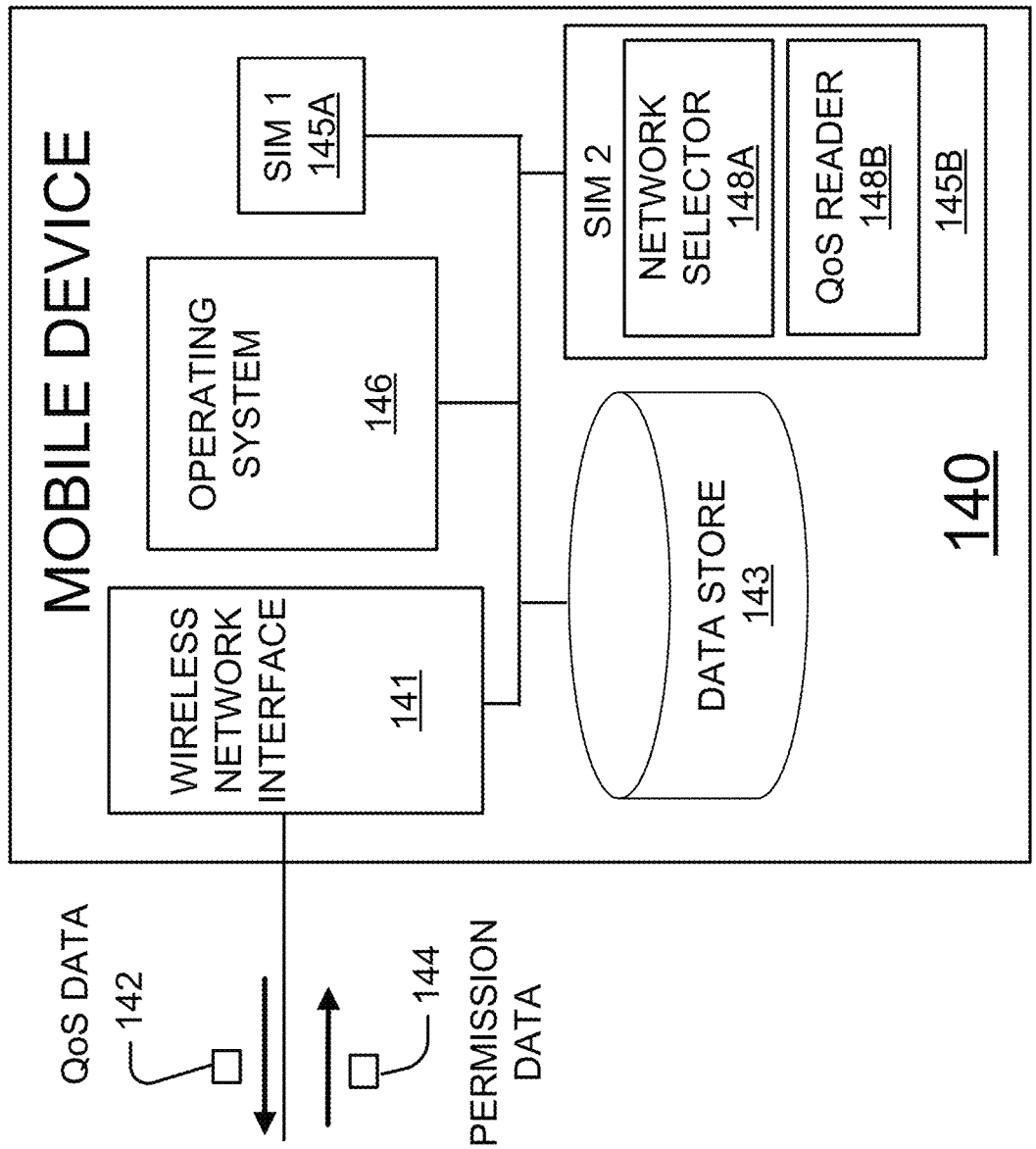
FIG. 2B is a block diagram of a mobile device in an example embodiment.

FIG. 2B illustrates the mobile device 140 in further detail. The mobile device 140 may include a wireless network interface 141 for communicating with the MNOs 110A-C via the cell sites 112A-D. The wireless network interface 141 may include at least one radio tunable to multiple frequencies licensed by the MNOs 110A-C. A mobile device operating system (OS) 146 may include one or more software and/or firmware platforms that direct operation of the mobile device hardware, including the network interface 141, a data store 143, and other hardware components (not shown), and provides a user interface at a display (not shown) for interacting with a user of the mobile device 140. The data store 143 may store the QoS data 142 and the permission data 144.

The second SIM 145B is shown in further detail, and may include a network selector module 148A and a QoS reader module 148B. The network selector module 148A may be a software module that facilitates connecting to the plurality of MNOs, providing instructions to the wireless network interface 141 for selecting and connecting to a MNO based on the permission data 144. Once engaged with the MNO, the QoS measurement module 148B may facilitate collecting the data for determining QoS of the MNO. For example, the QoS reader module 148B may provide instructions to the wireless network interface 141 to operate an assessment of one or more cell sites of the MNO, and may indicate a set of QoS metrics to measure regarding the connection to the one or more cell sites, including active and/or passive metrics as described above. The first and second SIMs 145A-B may each have a respective internal data store (not shown) for storing encrypted keys as described above, as well as software instructions (e.g., for operating the network selector 148A and QoS reader 148B).

Figure 3:
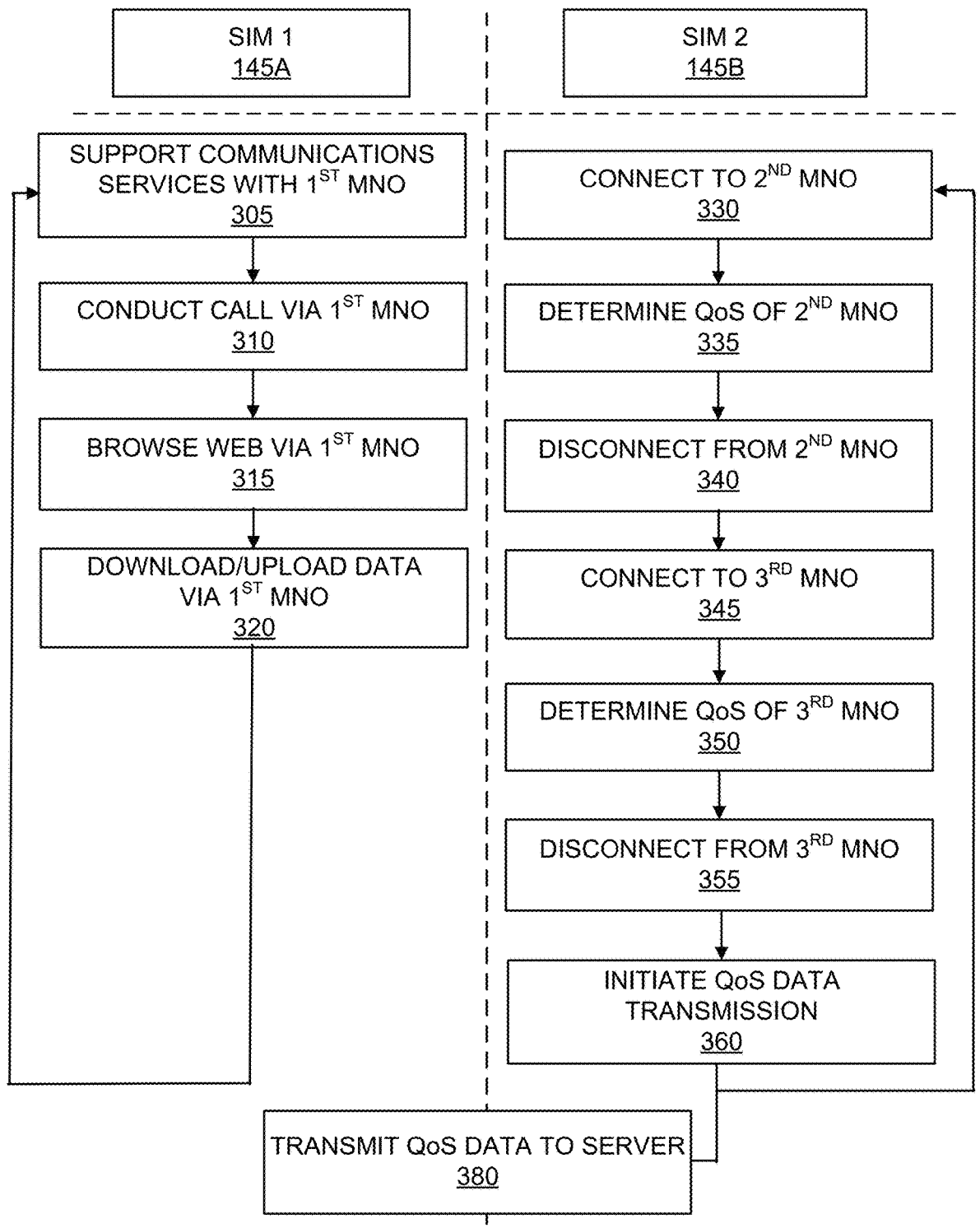
FIG. 3 is a flow diagram of a process of obtaining Quality of Service (QOS) data in one embodiment.

FIG. 3 is a flow diagram of a process 300 of obtaining QoS data in one embodiment, which may be carried out by the mobile device 140. With reference to FIG. 1, the mobile device 140 may support communications services with MNO A 110A through use of the first SIM 145A (305). For example, those communications services may include conducting a call (e.g., with the remote mobile device 180) (310), accessing the Internet 170 to browse web pages (315), and downloading and/or uploading data from/to a recipient (e.g., transmitting QoS data 142 to the server 120, receiving permission data 144 from the server 120) (320).

Concurrently with, and while preventing interruption of, the communications services with MNO A 110A, the mobile device 140 may also collect data for determining QoS associated with a given location and connectivity of the mobile device 140 to a plurality of MNOs through the use of the second SIM 145B. This process may be performed by engaging with each of the MNOs sequentially. For example, following instructions issued by the second SIM 145B, the mobile device 140 may connect to MNO B 110B (330). Specifically, the network selector module 148A may indicate MNO B 110B as the next MNO to assess for QoS data. Once connected, the mobile device 140 may determine passive and/or active QOS metrics of MNO B 110B for the given location of the mobile device 140, and may do so by assessing and/or communicating with a serving cell (e.g., cell site 112B) and one or more neighbor cells (e.g., cell site 112C) associated with MNO B 110B (335). This assessment process may be initiated and managed by instructions issued by the QoS reader module 148B of the second MNO 145B. Once the assessment process is complete, the mobile device 140 may disconnect from MNO 145B.

The process of connecting to a MNO, determining QoS of the MNO, and disconnecting from the MNO may be referred to as an "assessment" of a MNO, and may be repeated for each of the MNOs to be assessed. For example, the mobile device 140 may connect to MNO C 110C (345), determine QoS and collect QoS data of MNO C 110C (350), and disconnect from MNO C 110C (355). The process may also be performed to collect QoS data of MNO A 110A concurrently with the communications services being supported by MNO A 110A. Once QoS data is collected for each of the MNOs to be assessed, the mobile device 140 may then initiate transmission of the QoS data (360). Alternatively, the mobile device many initiate transmission following data collection of each MNO, or may delay transmission until after multiple cycles of QoS data collection. The mobile device 140 may then transmit the QoS data to the server 120 via a connection to an MNO enabled by the first SIM 145A (e.g., MNO A 110A), via a connection to another MNO enabled by the second SIM (e.g., MNOs 110B-C), and/or via a Wi-Fi channel (380). The entire process of QoS data collection (330-360) may then be repeated over a predefined time interval or until terminated. Thus, the mobile device 140, via the second SIM 145B, may collect the data for determining QoS by continuously cycling through data collection of the connectivity to each of the plurality of MNOs over a given length of time. In particular, the mobile device 140 may determine passive and/or active QoS metrics for a given MNO within a given interval of time (e.g., 10 seconds, 30 seconds, 60 seconds, 2-30 minutes), and repeat this action for a subsequent MNO within a subsequent interval of time. Therefore, the mobile device 140 may quickly cycle through assessments of each of the MNOs over a sequence of short intervals of time, and then repeat the process as determined by the second SIM 145B. Such a process may be particularly useful to obtain QoS data for multiple different locations as the mobile device 140 moves from one location to another, enabling the subscriber to learn how QoS for each MNO differs at several locations of interest (e.g., home, office, commute).

As an alternative to cycling through data collection of the connectivity to each of the plurality of MNOs over a given length of time, the mobile device 140 may be equipped with a plurality of SIMs that are configured comparably to the second SIM 145B. Each of the plurality of SIMs may be configured to connect with and collect QoS data from a respective MNO. For example, the second SIM 145B may be configured to assess MNO B 110B, a third SIM (not shown) may be configured to assess MNO C 110C, and a fourth SIM (not shown) may be configured to assess MNO A 110A. As a result, the mobile device 140 may be enabled to continuously collect QoS data from each of the MNOs 110A-C without cycling between them.

FIG. 4 is a table 400 illustrating example QoS data 142 that may be collected by the mobile device 140 through the process 300 described above. The table 400 may be stored in the same or a different format at the data store 143 of the mobile device and/or the QoS data store 125 of the server 120. Each row of the table 400 corresponds to a distinct entry of QoS data obtained by a given assessment, and may include some or all of the following fields:

a) A device identifier (ID) 405 identifies the mobile device collecting the data.
b) A MNO connection 410 identifies the MNO assessed by the mobile device.
c) A connection time 215 indicates the time at which the assessment occurred.
d) A serving cell ID 420 indicates the serving cell through which the mobile device 140 connected to the MNO.
e) The location ID 425 indicates the location of the mobile device at which the assessment occurred, which may be expressed as GPS or other coordinates obtained from the mobile device 140 (e.g., via an application running on the OS) during the assessment.
f) Passive QoS metrics 430 include information such as signal strength of the serving cell, signal quality of the serving cell, channel band of the serving cell, and other properties as described above.
g) Active QoS metrics 435 include information such as download speed, upload speed, latency, and jitter.

In further embodiments, the table 400 may include additional columns corresponding to QoS of neighbor cells. For example, the table 400 may include a field identifying one or more neighbor cell and a field including passive QoS metrics for the one or more neighbor cells. Alternatively, the serving cell ID 420 may instead be a cell site ID that covers both serving cells and neighbor cells, and QoS data for the neighbor cells may be assigned entries that are distinct from the entries from the serving cells.

FIG. 5 illustrates example permission data 144 that may be utilized by the mobile device 140 to determine which MNO on which to perform an assessment during a given time period. The permission data 144 may be stored in the same or a different format at the permission data store 126 of the server 120, and some or all of the data 144 may also be stored at the data store 143 of the mobile device. The permission data 144 as shown is formatted into several rows, wherein each row corresponds to a distinct list 501-504 (also referred to as a "table"). Each of the lists 501-504 may include some or all of the following fields:

a) A list ID 505 identifies the mobile device collecting the data.

b) An "allow" entry identifies the MNO to which the mobile device is permitted to connect while the list is active. The entry may indicate mobile country code (MCC) and/or mobile network code (MNC) parameters used to uniquely identify an MNO or other information identifying the MNO. For example, list #1 indicates that connection with MNO A is permitted.

c) A "block" entry identifies the MNOs from which the mobile device is prohibited from connecting while the list is active. The entry may identify the blocked MNOs by the same type of information found in the "allow" entry. For example, list #1 indicates that connection with MNO B, MNO C and MNO D is not permitted.

The lists 501-504 may be configured based on data indicating a predicted QoS for one or more of the MNOs. For example, predicted QoS data may be derived from prior QoS data collected from a plurality of mobile devices in the same or similar location as the mobile device. Thus, if an MNO is determined from prior QoS data to have poor or nonexistent service in a given location or region, then the MNO may appear only as a "block" entry in each of the lists 501-504. Likewise, the lists 501-504 may collectively designate only a subset of MNOs in "allow" entries, based on prior QoS data indicating that the subset of MNOs provide a QoS that exceeds a predetermined QoS threshold for the given location or region.

In one embodiment, the mobile device 140 may store all of the lists 501-504 to be utilized to its data store 143. Then, during a process of obtaining QoS data (e.g., process 300 described above), the network selector module 148A of the mobile device 140 may reference each of the lists 501-504 in sequence, with one list being active over a given time and indicating the MNO to assess during that time as "allowed." If the mobile device 140 continually references a single "active" list, then the active list may be periodically updated (i.e., cycled) to correspond to a subsequent one of the lists 501-504, as determined, for example, by the network selector module 148A. Alternatively, the mobile device 140 may communicate with the server 120 to determine a MNO to assess, as described immediately below.

Figure 6:
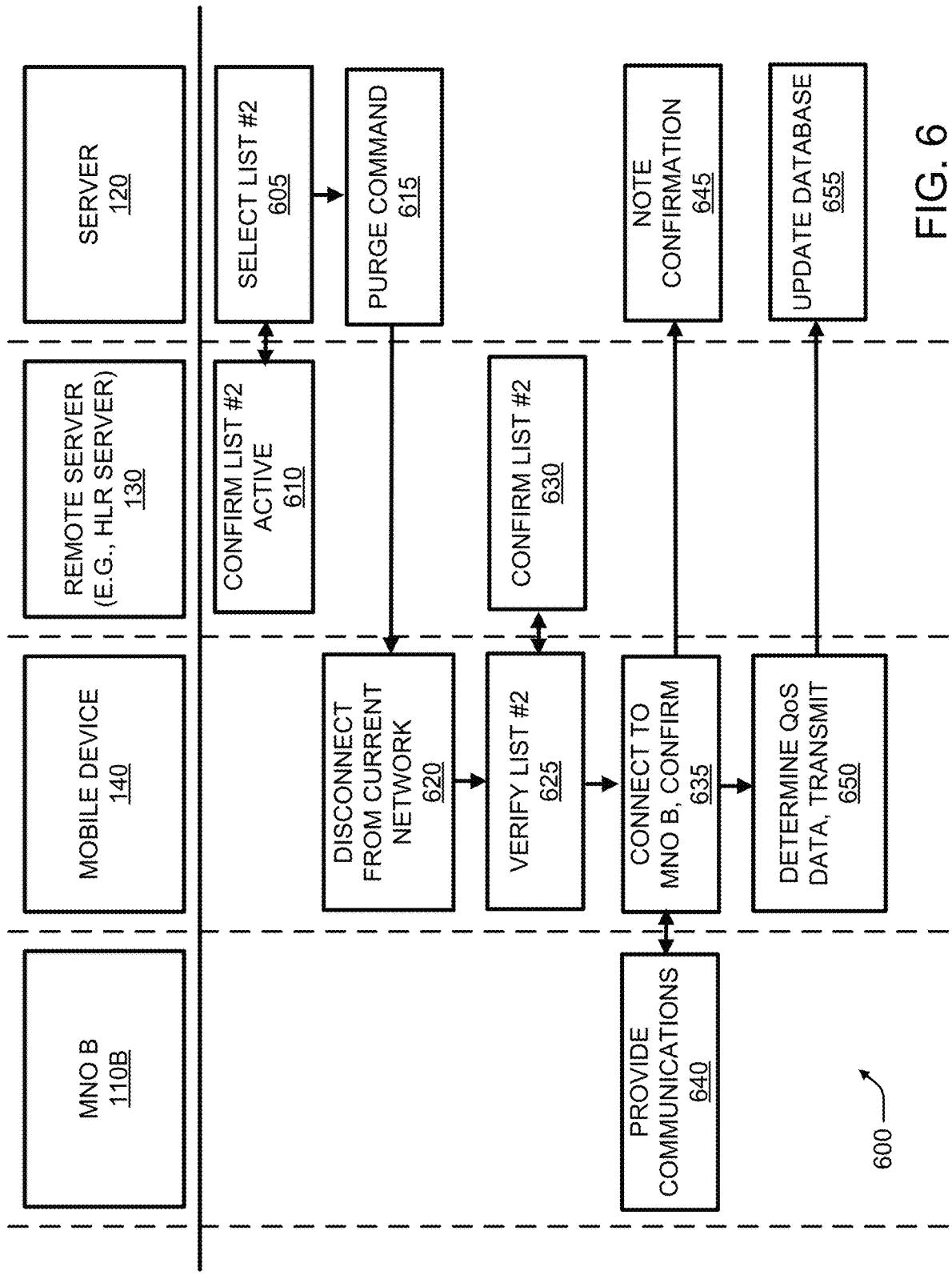
FIG. 6 is a flow diagram of a process of selecting and connecting to a mobile network operator (MNO) in one embodiment.

FIG. 6 illustrates a process 600 of selecting and connecting to a MNO for assessing based on the permission data 144. This process 600 may be performed in conjunction with the process 300 described above, and without interrupting communications services supported by the same or a different MNO. In this example, the server 120 may maintain the lists 501-505, determine which of the lists 501-505 is to be active during a given time, and communicate this determination to the mobile device 140. The server 120 may first select list #2 502 as the active list for the given time (605), and then communicate this selection to a remote server 130 (e.g., an HLR server) accessible to the mobile device 140. List #2 502 designates MNO B 110B as "allowed," and the remote server 130 may respond to the server 120 by confirming that list #2 is active (610). Then, to initiate connection to MNO B 110B, the server 120 may issue a "purge" command to the mobile device 140 (615), which causes the mobile device 140 to disconnect from the MNO currently being assessed, if any (620). The purge command may also indicate the selected list, or the mobile device 140 may already be configured to move to the selected list in a predefined sequence.

The mobile device 140 may then verify that list #2 502 is active by communicating with the remote server 130 (625), which may reply with a confirmation (630). The mobile device 140 may then connect to MNO B 110B and transmit a confirmation of the connection to the server 120, which may note the confirmation (635, 645). Once connected, MNO B 110B may provide communications service to the mobile device 140 (640), and the mobile device 140 may measure passive and/or active metrics of that service to determine QoS data for MNO B 110B for the location of the mobile device 140 (650). The mobile device 140 may then transmit the collected QoS data 142 to the server 120, which, in turn, may update the QoS data store 125 to incorporate the collected QoS data (655). For example, the server 120 may update a table such as the table 400 by adding an entry corresponding to the collected QoS data.

Figure 7:
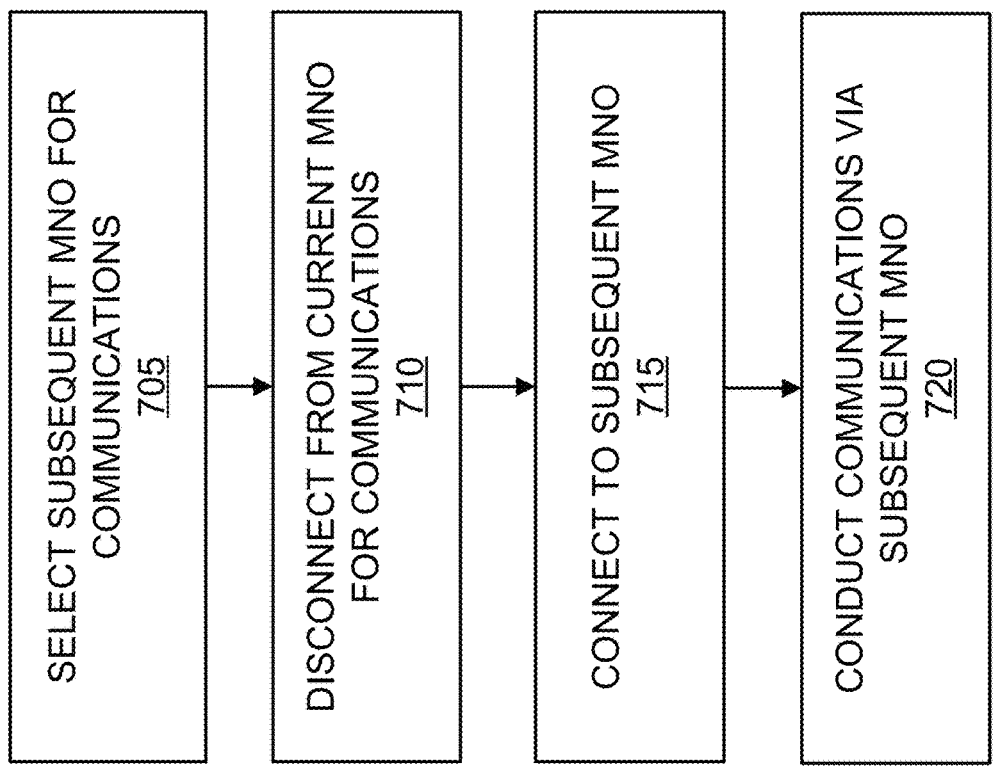
FIG. 7 is a flow diagram of a process of reconfiguring a mobile device for communications with a subsequent MNO in one embodiment.

FIG. 7 illustrates a process of reconfiguring a mobile device for communications with a subsequent MNO. With reference to FIG. 1, in one embodiment, the first SIM 145A may be an eSIM or another type of configurable SIM that can be reconfigured to connect with multiple different MNOs for communications services. This feature can be used in combination with the assessing performed via the second SIM 145B to identify an MNO providing an optimal QoS for the given location, and then switch the communications services to that MNO.

For example, the mobile device 140 may be connected initially to MNO A 110A for communications services through the use of the first SIM 145A as shown in FIG. 1. Based on the data for determining QoS collected via the second SIM 145B, the mobile device 140 may select a subsequent MNO, such as MNO B 110B, for future communications services (705). This selection may be completed by reconfiguring the first SIM 145A to indicate subscriber status with MNO B 110B. The mobile device 140, using the reconfigured first SIM 145A, may then disconnect from the MNO A 110A (710) and connect to MNO B 110B (715). The mobile device 140 may then conduct communications via the MNO B 110B (720).

Figure 8:
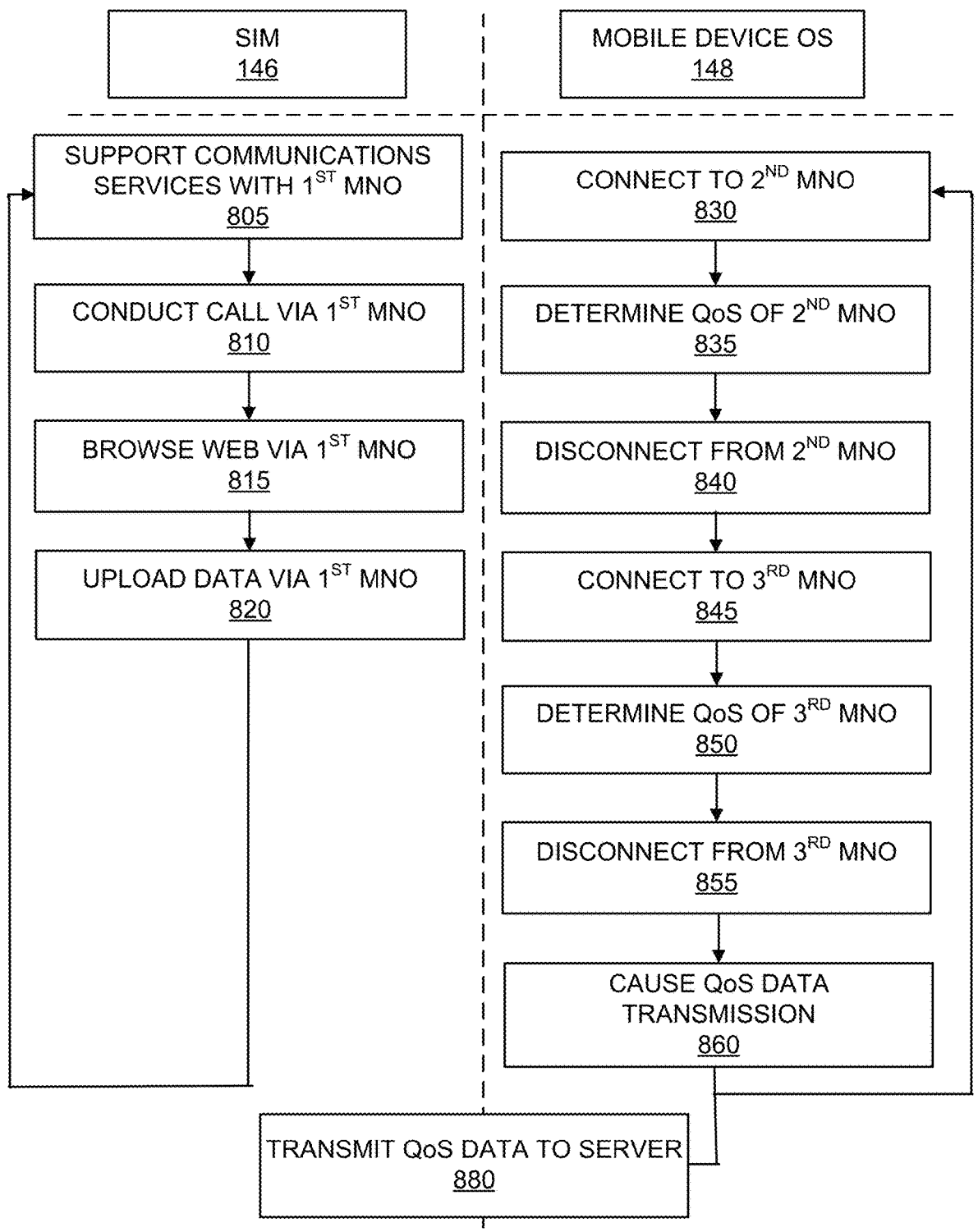
FIG. 8 is a flow diagram of a process of obtaining QoS data in a further embodiment.

FIG. 8 illustrates a process 800 of obtaining QoS data in a further embodiment. The process 800 may be comparable to the process 300 describe above, with the exception that the assessing process is directed by the OS 148 of the mobile device 140 rather than the second SIM 145A. The second SIM 145A may be omitted from the mobile device 140 in such an embodiment. With reference to FIG. 1, the mobile device 140 may support communications services with MNO A 110A through use of the first SIM 145A (805), such as conducting a call (810), accessing the Internet 170 to browse web pages (815), and downloading and/or uploading data from/to a recipient (820).

Concurrently with, and while preventing interruption of, the communications services with MNO A 110A, the OS 148 may also direct the collection of data for determining QoS associated with a given location and connectivity of the mobile device 140 to a plurality of MNOs. This process may be performed by engaging with each of the MNOs sequentially. For example, as directed by the OS 148, the mobile device 140 may connect to MNO B 110B (830). Once connected, the OS 148 may determine passive and/or active QoS metrics of MNO B 110B for the given location of the mobile device 140, and may do so by assessing and/or communicating with a serving cell (e.g., cell site 112B) and one or more neighbor cells (e.g., cell site 112C) associated with MNO B 110B (835). Once the assessment process is complete, the OS 148 may cause the mobile device 140 to disconnect from MNO 145B. This process may be completed without establishing an active connection or handshake with an MNO to be assessed. Rather, the OS 148 may issue a command to trigger the wireless network interface 141 to assess each cellular frequency, either sequentially or simultaneously, and record passive QoS metrics for that frequency. Such QoS metrics may be more limited than the metrics that can be collected with an active connection, as described above. The OS 148 may then manage communications to consult a cellular frequency license database for the location of the mobile device 140 to match the assessed frequency to a MNO. This OS 148 may then map the location to the assessed frequency to provide a comparison of QoS.

The above process of assessing a MNO may be repeated for each of the MNOs to be assessed. For example, the OS 148 may direct the mobile device 140 to connect to MNO C 110C (845), determine QoS and collect QoS data of MNO C 110C (850), and disconnect from MNO C 110C (855). The process may also be performed to collect QoS data of MNO A 110A concurrently with the communications services being supported by MNO A 110A. Once QoS data is collected for each of the MNOs to be assessed, the OS 148 may then initiate transmission of the QoS data (860). Alternatively, the mobile device many initiate transmission following data collection of each MNO, or may delay transmission until after multiple cycles of QoS data collection. The mobile device 140 may then transmit the QoS data to the server 120 via a connection to an MNO enabled by the first SIM 145A (e.g., MNO A 110A) and/or via a Wi-Fi channel (880). The entire process of QoS data collection (830-860) may then be repeated over a predefined time interval or until terminated. Thus, the mobile device 140, via the OS 148, may collect the data for determining QoS by continuously cycling through data collection of the connectivity to each of the plurality of MNOs over a given length of time. In particular, the OS 148 may determine passive and/or active QoS metrics for a given MNO within a given interval of time (e.g., 10 seconds, 30 seconds, 60 seconds, 2-30 minutes), and repeat this action for a subsequent MNO within a subsequent interval of time. Therefore, the mobile device 140 may quickly cycle through assessments of each of the MNOs over a sequence of short intervals of time, and then repeat the process as determined by the OS 148.

FIG. 9 is a screenshot 900 of a user interface (UI) displaying formatted QoS data for presentation to a user. The user, who may be a subscriber to one or more of the MNOs and/or the owner of the mobile device 140, may view the formatted QoS data at a display such as the display of the mobile device 140. The formatted QoS data may be a product of processing the QoS data 142 (e.g., raw QoS data) to derive data most relevant to a user considering which of multiple MNOs to select as a service provider. For example:
  a) A first column may list the locations at which an assessment of MNOs was performed.
  b) A second column may indicate each of the MNOs assessed at the listed locations.
  c) A "passive score" may be a weighted score that is a compilation of the passive metrics measured during the assessments, and may be scaled to a given range (e.g., 1-10).
  d) An "average download speed" rating may provide a simplified rating of the average download speed measured during the assessment of each MNO. Additional active metrics, such as upload speed, latency, and jitter, may also be presented as comparable ratings (not shown).

The user may consider the formatted QoS data to determine an optimal MNO based on the presented scores and ratings for the locations most important to the user.

The quantum of raw QoS KPI attributes analyzed to produce an actionable insight on the overall network QoS for a specified MNO at a given location is significant (e.g., over 200,000 unique data points may be measured each day by a given mobile device). Attributes used to assess network QoS may be largely passive attributes measured by the mobile device, such as the passive metrics described above, as well as some or all of the active metrics described above, device location, movement and usage characteristics. Other attributes, such as specific cell site information and various representations of network congestion, may also be used. It is impractical for an end user, given the quantum of data and required expert knowledge on the determinants of wireless QoS, to infer a QoS insight from the raw data alone. An actionable insight requires process and analysis automation.

Example embodiments may use dependent variables (e.g., the results of download speed tests, upload speed tests, latency tests, jitter tests) to represent overall network QoS performance and/or user experience. Additional attributes (e.g., end-user feedback) may also be used as dependent variables to define network performance and/or user experience. Sets of passive attributes (e.g., independent variables) may be paired with results from active tests (e.g., download speed tests) to create training data.

The training data may be used to train classification and/or regression models. Classification models may predict whether the dependent variable falls within a specific range, whereas regression models may predict the dependent variable directly. In addition to classification and regression, ordinal regression models can be used. These models may optionally be specific to time-series data. On-line (e.g., the method of modeling where the model is continually trained in a live fashion instead of training on a given set of data and then being used for inference) and reinforcement learning are also potential modes of analysis.

The output of these models may be used as input to a scoring model, which aggregates network performance over longer timeframes and outputs an overall network performance analysis to the user. The models may also be designed to handle both the dependent variable prediction and performance aggregation to create a single model that takes raw data and directly calculates a network performance analysis.

Figure 10:
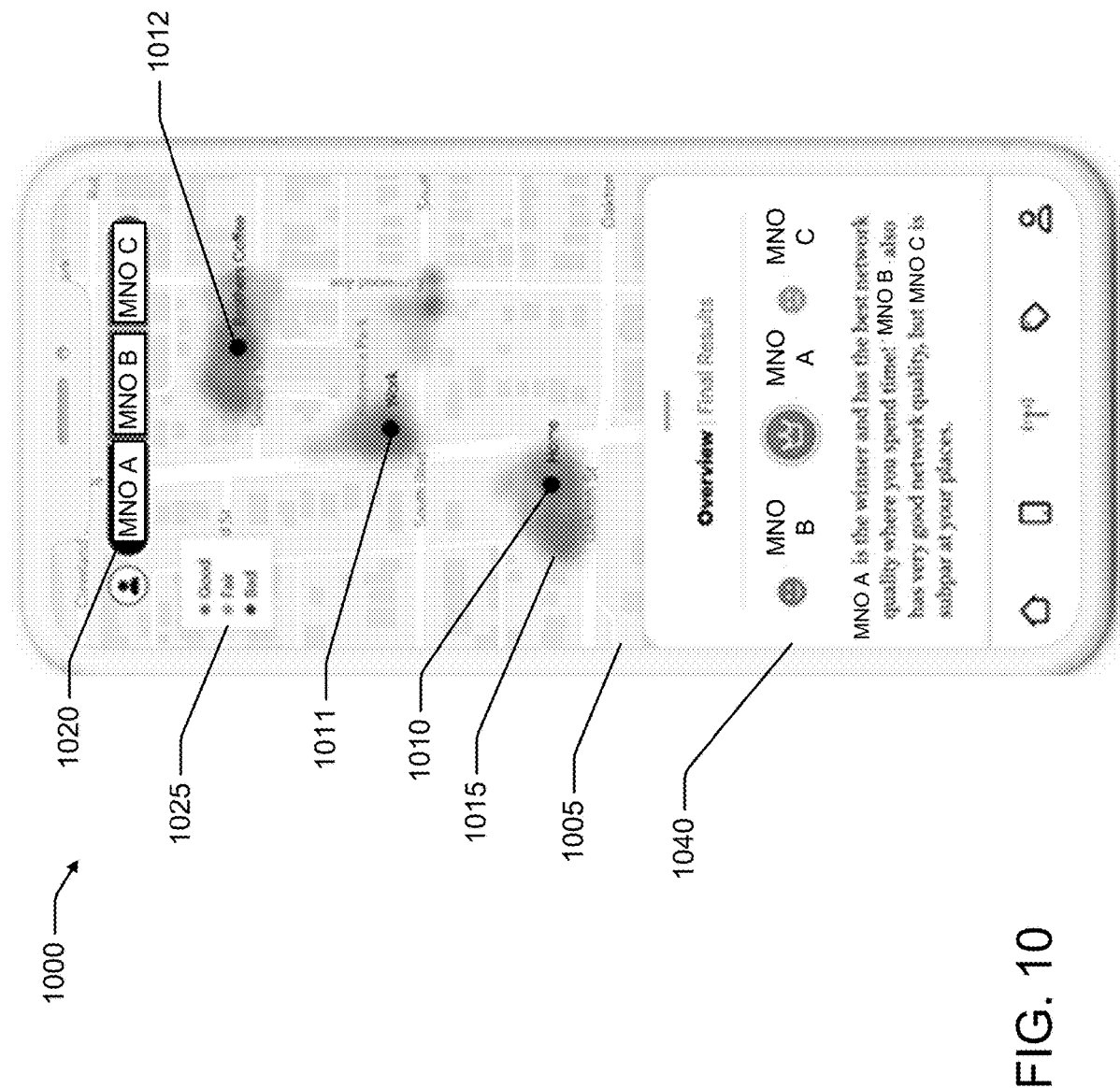
FIG. 10 is a screenshot of a user interface displaying a QoS data map in one embodiment.

FIG. 10 is a screenshot 1000 of a user interface displaying a QoS data map in one embodiment. As with the screenshot 900 described above, the screenshot 1000 may be displayed at a display of the mobile device 140 or another screen, and may present information derived from the QoS data such as the data included in the table 400. In contrast to the table shown in the screenshot 900, the screenshot 1000 displays QoS information superimposed on a map 1005 of locations relevant to the user. As shown, for example, the map 1005 includes three marked locations of interest to the user: Home 1010, Work 1011, and a coffee shop 1012. The locations may be labeled by the user and may be mapped to QoS data obtained within the vicinity of each location.

Using a selection bar 1020, the user may select one of the MNOs to view a measured QoS map for each MNO. When an MNO is selected, the map 1005 may display QoS areas (e.g., area 1015) that encompass each of the marked location (and, optionally, other locations or regions) and illustrate the measured QoS at the given locations. The QoS areas may optionally be color-coded, and a legend 1025 may indicate a QoS level for each of the areas (e.g., green="superior," yellow="fair," red="inferior"). In response to the user selecting a different MNO at the selection bar 1020, the mobile device 140 may update the map 1005 to display QoS information for the newly-selected MNO.

Lastly, an overview window 1040 may provide a summary of the QoS information for each of the MNOs. As shown, the window 1040 may display a ranking of the MNOs by relative QoS for the user's locations of interest, as well as a summary paragraph indicating which of the MNOs are superior, fair, or inferior for supporting communications services in the locations of interest. In this example, the window 1040 indicates that that MNO A provides the superior QoS, MNO B provides a fair QoS, and MNO C provides an inferior QoS.

While example embodiments have been particularly shown and described, it will be understood by those skilled in the art that various changes in form and details may be made therein without departing from the scope of the embodiments encompassed by the appended claims.

What is claimed is:

1. A method of obtaining Quality of Service (QOS) data with an operating mobile device, the method comprising:
   supporting communications services with a first mobile network operator (MNO) through use of a first subscriber identity module (SIM) associated with the operating mobile device;
   while preventing interruption of the communications services with the first MNO, collecting data for determining QoS associated with a given location and connectivity of the operating mobile device to a plurality of MNOs including a second MNO through use of a second SIM associated with the operating mobile device;
   determining QoS of each of the plurality of MNOs for the given location based on the data for determining QoS; and
   displaying the QoS at a user interface, including displaying including at least one of 1) a table cross-referencing given location, the plurality of MNOs, and the QoS, and 2) a map including the QoS superimposed at the given location indicated by the map.

2. The method of claim 1, wherein collecting the data for determining QoS includes:
   connecting to the second MNO corresponding to subscriber information indicated by the second SIM;
   determining QoS of the second MNO for the given location of the mobile device;
   disconnecting from the second MNO;
   connecting to a third MNO corresponding to subscriber information indicated by the second SIM; and
   determining QoS of the third MNO for the given location of the mobile device.

3. The method of claim 1, wherein collecting the data for determining QoS includes:
   connecting to the first MNO corresponding to subscriber information indicated by the second SIM; and
   determining QoS of the first MNO for the given location of the mobile device.

4. The method of claim 1, wherein collecting the data for determining QoS includes determining at least one of a radio access network technology of a serving cell of the second MNO, signal strength of the serving cell, signal quality of the serving cell, channel band of the serving cell, spectrum frequency of the serving cell, channel width of the serving cell, congestion on the serving cell, physical location of the serving cell, and carrier aggregation status of a connection to the second MNO.

5. The method of claim 1, wherein collecting the data for determining QoS includes determining at least one of a radio access network technology of a neighbor cell of the second MNO, signal strength of the neighbor cell, signal quality of the neighbor cell, channel band of the neighbor cell, spectrum frequency of the neighbor cell, channel width of the neighbor cell, congestion on the neighbor cell, physical location of the neighbor cell, and carrier aggregation status of a connection to the second MNO.

6. The method of claim 1, wherein collecting the data for determining QoS includes determining at least one of download speed, upload speed, latency, and jitter.

7. The method of claim 1, further comprising transmitting QoS data to a server, the QoS data indicating the service quality of at least the second MNO and the given location of the mobile device.

8. The method of claim 7, wherein the QoS data is transmitted via a connection to the first MNO enabled by the first SIM.

9. The method of claim 7, wherein the QoS data is transmitted via a connection to the second MNO enabled by the second SIM.

10. The method of claim 7, wherein the QoS data is transmitted via at least one of a Wi-Fi channel and a Bluetooth channel.

11. The method of claim 1, wherein the second SIM is one of an embedded-SIM (eSIM) and a physical SIM (pSIM), and wherein connecting to the plurality of MNOs is conducted via a network selector module of the second SIM.

12. The method of claim 1, wherein collecting the data for determining QoS is conducted via a QoS measurement module of the second SIM.

13. The method of claim 1, further comprising:
   selecting, based on the data for determining QoS, a subsequent MNO for communications with the mobile device;
   disconnecting from the first MNO;
   connecting to the subsequent MNO, the subsequent MNO being one of plurality of MNOs excluding the first MNO; and
   conducting communications via the subsequent MNO with the mobile device.

14. The method of claim 13, wherein connecting to the subsequent MNO is via the first SIM.

15. The method of claim 13, further comprising configuring the first SIM for communications with the subsequent MNO.

16. The method of claim 1, wherein collecting the data for determining QoS includes continuously cycling through data collection of the connectivity to each of the plurality of MNOs over a given length of time.

17. The method of claim 1, wherein collecting the data for determining QoS is initiated in response to a user selection via a user interface of the mobile device, the user selection indicating a command to collect the data for the present location of the mobile device.

18. The method of claim 1, wherein collecting the data for determining QoS includes continuously cycling through data collection of the connectivity to each of the plurality of MNOs over a given length of time during movement of the mobile device through a plurality of locations including the given location.

19. The method of claim 18, further comprising:
   determining QoS of each of the plurality of MNOs for each of the plurality of locations based on the data for determining QoS; and displaying the QoS at a user interface of the mobile device.

20. The method of claim 19, wherein displaying the QoS includes displaying at least one of 1) a table cross-referencing the plurality of locations, the plurality of MNOs, and the QoS, and 2) a map including the QoS superimposed at each of the plurality of locations indicated by the map.

21. The method of claim 1, wherein the user interface is a user interface of the mobile device.

22. The method of claim 1, further comprising:
determining QoS of each of the plurality of MNOs for the given location based on the data for determining QoS; and
displaying, at a user interface of the mobile device, an indication that the QoS of at least one of the plurality of MNOs for the given location is inferior.

23. A method of obtaining Quality of Service (QOS) data with an operating mobile device, the method comprising:
supporting communications services with a first mobile network operator (MNO) through use of a first subscriber identity module (SIM) associated with the operating mobile device;
verifying permission to connect to a second MNO based on a table indicating a plurality of MNOs, the table indicating that connection to the second MNO is permitted and connection to all other MNOs is not permitted; and
while preventing interruption of the communications services with the first MNO, collecting data for determining QoS associated with a given location and connectivity of the operating mobile device to a plurality of MNOs including the second MNO through use of a second SIM associated with the operating mobile device;
wherein collecting the data for determining QoS includes collecting the data for each of the plurality of MNOs within a time interval between 21 seconds and 10 minutes.

24. The method of claim 23, wherein the table associates a permission to connect to each of the plurality of MNOs.

25. The method of claim 23, further comprising refraining from connecting with a fourth MNO based on an indication by the table indicating that connection to the fourth MNO is not permitted.

26. The method of claim 23, further comprising configuring the table based on external data indicating a predicted QoS for at least one MNO, the predicted QoS being based on prior QoS data collected from a plurality of mobile devices.

27. The method of claim 23, further comprising:
updating the table to indicate permission to connect to a third MNO and to indicate that connection to the second MNO is not permitted; and
verifying permission to connect to the third MNO based on the table.

28. The method of claim 27, wherein updating the table is based on data received by the mobile device from a remote server.

29. The method of claim 23, wherein the table is a first table, and further comprising:
verifying permission to connect to a third MNO based on a second table indicating a plurality of MNOs.

30. The method of claim 29, further comprising, while collecting data for determining QoS, cycling between the first and second tables for verifying permission to connect to the second and third MNOs.

31. A method of obtaining Quality of Service (QOS) data with an operating mobile device, the method comprising:
supporting communications services with a first mobile network operator (MNO) through use of a first subscriber identity module (SIM) associated with the operating mobile device; and
while preventing interruption of the communications services with the first MNO, collecting data for determining QoS associated with a given location and connectivity of the operating mobile device to a plurality of MNOs including a second MNO through use of a second SIM associated with the operating mobile device;
wherein collecting the data for determining QoS includes collecting the data for each of the plurality of MNOs within a time interval between 21 seconds and 10 minutes.

32. A method of obtaining Quality of Service (QOS) data with an operating mobile device, the method comprising:
supporting communications services with a first mobile network operator (MNO) through use of a first subscriber identity module (SIM) associated with the operating mobile device; and
while preventing interruption of the communications services with the first MNO, collecting data for determining QoS associated with a given location and connectivity of the operating mobile device to a plurality of MNOs including a second MNO through use of a second SIM associated with the operating mobile device;
generating compressed QoS data from the data for determining QoS, the compressed QoS data indicating the service quality of at least the second MNO and the given location of the mobile device and having a reduced file size relative to the data for determining QoS; and
transmitting the compressed QoS data to a server.

33. A method of determining quality of service (QOS), the method comprising:
enabling operation of at least one radio in a mobile device, the at least one radio being tunable to multiple frequencies licensed by mobile network operators (MNOs); and
while preventing interruption of communications services with a first MNO:
assessing a plurality of MNOs, including a second MNO, via the at least one radio tuned to a respective frequency of each of the plurality of MNOs, to collect data for determining QoS for each of the plurality of MNOs in accordance with a command issued through an operating system of the mobile device;
determining, based on the data, QoS of each of the plurality of MNOs for a given location of the mobile device; and
outputting a representation of the QoS of each of the plurality of MNOs;
wherein assessing the plurality of MNOs includes collecting the data for each of the plurality of MNOs within a time interval between 21 seconds and 10 minutes.

34. The method of claim 33, wherein determining the QoS includes determining at least one of a radio access network technology of a serving cell of the second MNO, signal strength of the serving cell, signal quality of the serving cell, channel band of the serving cell, spectrum frequency of the serving cell, channel width of the serving cell, congestion on the serving cell, physical location of the serving cell, and carrier aggregation status of a connection to the second MNO.

35. The method of claim 33, wherein determining the QoS includes for determining QoS includes determining at least one of a radio access network technology of a neighbor cell of the second MNO, signal strength of the neighbor cell, signal quality of the neighbor cell, channel band of the neighbor cell, spectrum frequency of the neighbor cell, channel width of the neighbor cell, congestion on the neighbor cell, physical location of the neighbor cell, and carrier aggregation status of a connection to the second MNO.

36. The method of claim 33, wherein determining the QoS includes determining at least one of download speed, upload speed, latency, and jitter.

37. The method of claim 33, further comprising transmitting QoS data to a server, the QoS data indicating the service quality of at least the second MNOs and the given location of the mobile device.

38. The method of claim 33, wherein assessing the plurality of MNOs includes continuously cycling through data collection of the connectivity to each of the plurality of MNOs over a given length of time.

39. The method of claim 33, wherein assessing the plurality of MNOs includes collecting the data for each of the plurality of MNOs within a 60-second interval of time.

40. The method of claim 33, further comprising:
generating compressed QoS data from the data for determining QoS, the compressed QoS data indicating the service quality of at least the second MNO and the given location of the mobile device and having a reduced file size relative to the data for determining QoS; and
transmitting the compressed QoS data to a server.

41. A non-transitory computer-readable medium storing instructions that, when executed by an operating mobile device, cause the operating mobile device to:
support communications services with a first mobile network operator (MNO) through use of a first subscriber identity module (SIM) associated with the operating mobile device;
while preventing interruption of the communications services with the first MNO, collect data for determining quality of service (QOS) associated with a given location and connectivity of the operating mobile device to a plurality of MNOs including a second MNO through use of a second SIM associated with the operating mobile device;
determine QoS of each of the plurality of MNOs for the given location based on the data for determining QoS; and
display the QoS at a user interface of the mobile device, including displaying including at least one of 1) a table cross-referencing given location, the plurality of MNOs, and the QoS, and 2) a map including the QoS superimposed at the given location indicated by the map.

* * * * *